INVENTOR

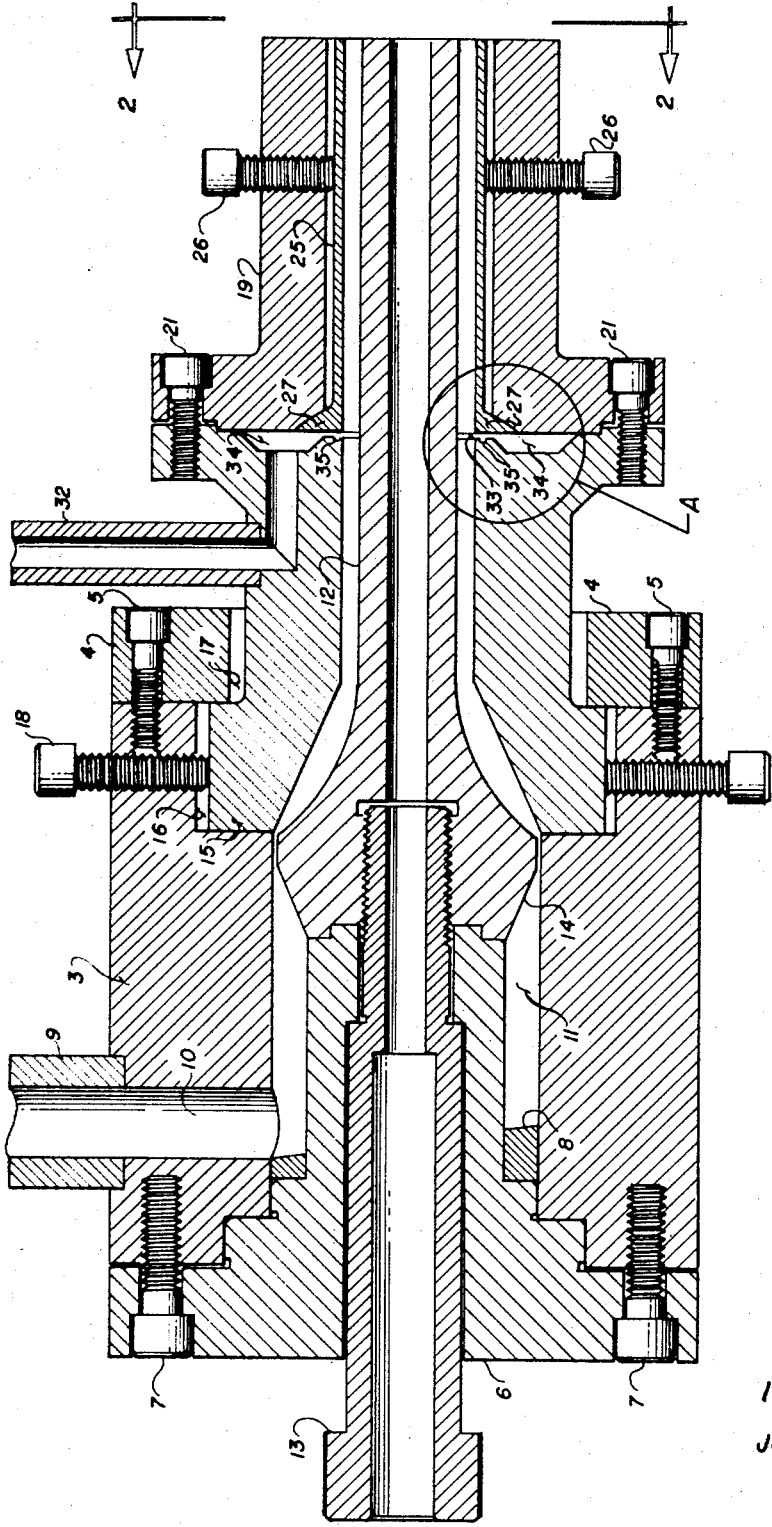

John J. Lainson

By  A. G. Downs

Attorney

United States Patent Office 3,447,204
Patented June 3, 1969

3,447,204
EXTRUSION APPARATUS
John J. Lainson, 1600 N. Elm, Hastings, Nebr. 68901
Filed May 1, 1967, Ser. No. 635,235
Int. Cl. B29f 3/014; B29d 5/00
U.S. Cl. 18—14                                    7 Claims

ABSTRACT OF THE DISCLOSURE

A die for extruding a multiple layer plastic cylinder of the type employed in tubes or container walls. This die effects the simultaneous extrusion of bonded plastic layers with adjusting means being provided to control the total concentricity of the complete cylinder wall, and also the relative concentricity of one of the cylinder layers with respect to the other cylinder layer. An improved relative concentricity adjustment is attained by providing for the pivotal rotation on its longitudinal axis of an outer layer formng sleeve relative to an inner layer forming sleeve to control a concentricity passage defined by both sleeves. Additionally, a flow equalizing groove is located at this passage so that any foreign particles clogging the plastic input to the passage will not create layer imperfections.

BACKGROUND OF THE INVENTION

Field of invention

The present invention relates to an improved die for simultaneously extruding multiple layers of plastic in cylinder form for use in diverse applications, such as, plastic pipes for plumbing and irrigation installations, and material containers which require a multiple layer plastic wall.

Descrption of the prior art

Lainson Patent 2,859,476 discloses the basic die structure which has been improved by the present invention. The die embodiment of this patent features a structural arrangement for adjusting the relative concentricity of the various layers comprising a multiple layer extruded tube, and also the concentricity of the total tube wall relative to its bore.

In particular, a pair of sleeves are suitably mounted end-to-end within a die casing around a forming mandrel. The two sleeves are coupled one to the other and to the die casing in such a manner that adjustment of a first set of screws varies the relative concentricity of both sleeves with respect to the tube forming mandrel. This adjustment determines the concentricity of the total cylinder wall with respect to its bore.

One of the sleeves is also coupled to the other sleeve in such a manner that a relative adjustment between the two sleeves is also provided which determines the relative concentricity of the individual layers forming the tube wall. This adjustment is effected by a second set of adjusting screws which determines the spacing of a concentricity throat established by a closely spaced projecting shoulder and lip formed on the two sleeves.

SUMMARY OF THE INVENTION

The present invention constitutes an improvemnet in the prior Lainson structure that controls the relative concentricity of the outer and inner layers. Additionally, an improved feature is provided which enables a uniform outer layer to be extruded and simultaneously bonded to the inner layer under the circumstances that foreign plastic particles are lodged in the input passages leading to the concentricity throat.

A preferred structural embodiment of these improvements comprises the addition of a pivot flange on an outer layer forming sleeve in an area adjacent the concentricity throat. This sleeve is therefore rotatable rather than subject to a transverse movement. A relative concentricity adjustment of the inner and outer plastic layers is attained by rotating the sleeve on its longitudinal axis. This operation adjusts the annular orifice of the concentricity throat which supplies the plastic material forming the outer layer. Thus, various peripheral portions of the throat are opened and partially closed as is required to adjust the quantitative plastic flow to the outer layer.

Partial closure of the concentricity throat can cause foreign particles to lodge in the adjacent plastic feed passages. This occurence can starve the outer layer in a particular line area thereby causing a manufacturing imperfection. A flow equalizing reservoir groove is formed adjacent the feed passages so that constant, but nonetheless regulated, plastic flow can be provided to the entire circular periphery of the concentricity throat, even in the repsence of flow obstructions.

BRIEF DESCRIPTION OF THE DRAWINGS

In the drawings, FIG. 1 is a cross sectional view of a preferred embodiment of the extrusion die of this invention;

DESCRIPTION OF THE PREFERRED EMBODIMENT

Figure 4:
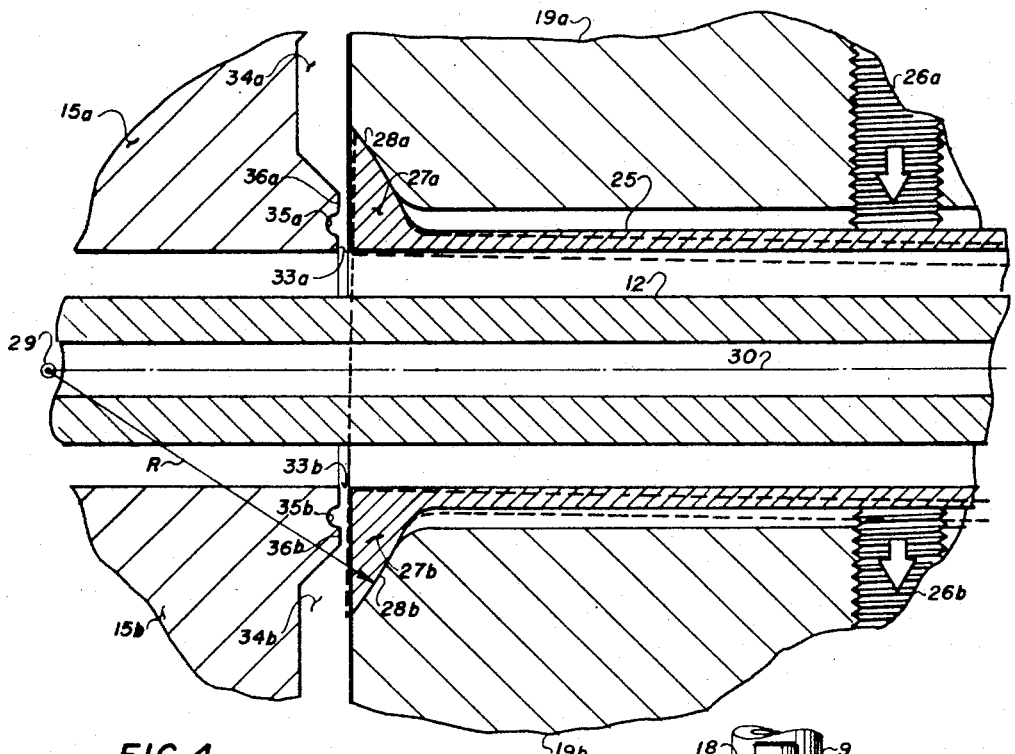
FIG. 4 is an enlarged view showing the entire concentricity throat and the manner of its adjustment in response to rotation of the outer layer forming sleeve.

Referring to the preferred embodiment of the invention shown in the drawings, the casing of the extrusion die comprises a central ring 3 and a flat ring 4 fixedly coupled one to the other by means of a plurality of circularly disposed screws 5. The composite bore defined by rings 3 and 4 presents a step contour formed by the different inside diameters of the two rings.

Plug 6 is inserted into the bore of ring 3 and is fixedly coupled to this ring by a plurality of circularly disposed screws 7. A tapered washer 8 is positioned over the shank of plug 6 and within the bore of ring 3. A feed tube 9 for the inner plastic layer is coupled to ring 3, and a circular passage 10 is formed through central ring 3 in axial alignment with the bore of tube 9. The leftmost circumferential point of passage 10 is positioned closely to the rightmost edge of the upper surface of tapered washer 8, whereby the flow of liquid plastic material through feed tube 9 and passage 10 into reservoir 11 is directed in part by tapered washer 8.

The right end of plug 6 is notched to engage a mating shoulder formed in the left end of mandrel pipe 12 inserted within the composite bore of rings 3 and 4. Plug 6 and mandrel pipe 12 are fixedly coupled with respect to one another by means of coupling 13. The left portion of mandrel 12 is formed with a head 14 which serves as a mandrel for shaping into tubular form the plastic material fed into the die at feed tube 9. It should be noted that component 3, 4, 6, 8, 12 and 13 are fixedly positioned on a single common longitudinal axis.

Rings 3 and 4 lock an inner layer forming sleeve 15 having a stepped outside diameter into associated coupling with mandrel 12 so that the closely adjacent surfaces of mandrel 12 and sleeve 15 can further form the tubular layer of plastic material which advances past the mandrel and comprises the inner layer. A pair of annular spaces 16 and 17 are provided between the overlapping portions of rings 3, 4 and sleeve 15, whereby the movement of sleeve 15 in a direction transverse to the longitudinal axis of the die is permitted. A plurality of circularly disposed screws 18 pass through the shoulder formed at the right end of ring 3. The particular setting of screws 18 adjusts the concentricity of sleeve 15 with respect to the longitudinal axis of the die, which axis also serves as a common axis for mandrel 12.

Ring 19 is rigidly fixed to the right end of sleeve 15 by a plurality of circularly disposed screws 21. Outer layer forming sleeve 25 is disposed within the bore of ring 19, and a set of circularly disposed screws 26 adjust the relative position of outer layer forming sleeve 25 with respect to ring 19 and also mandrel 12 as hereinafter set forth in detail.

Figure 3:
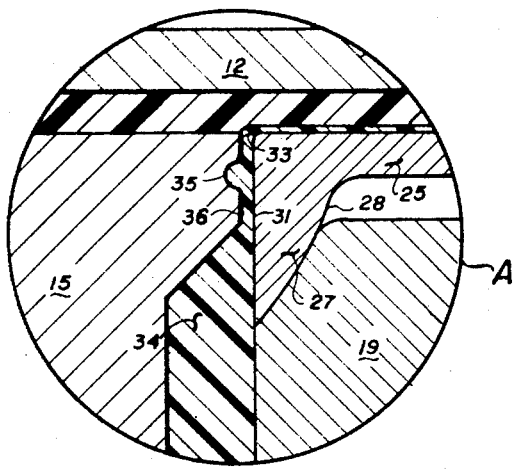
FIG. 3 is an enlarged view of circular section A of FIG. 1 and showing in detail the structure of part of the concentricity throat and the flow equalizing groove.
Figure 2:
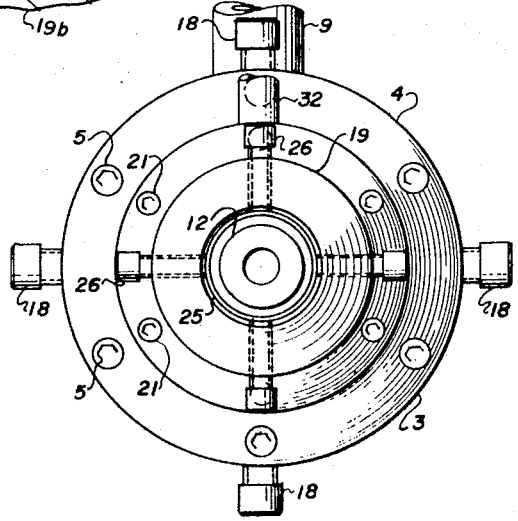
FIG. 2 is an end view taken along line 2—2 of FIG. 1.

As is best shown in the enlarged view A of FIG. 3, and FIG. 4, sleeve 25 is formed with a projecting pivot flange 27 located on the left end of sleeve 25 adjacent the right end of inner layer forming sleeve 15. Pivot flange 27 has a circularly shaped bearing surface 28. This bearing surface has a rotating center 29 (FIG. 4) on the longitudinal axis 30 of the die (FIG. 4). Bearing surface 28 mates with a corresponding bearing surface located on ring 19. Appropriate adjustment of screws 26 rotates sleeve 25 on these bearing surfaces relative center 29 to permit an angular or tilting disposition of sleeve 25 with respect to forming mandrel 12 and also the longitudinal axis 30 of the die as is shown in broken line in FIG. 4.

The left surface portion 31 of pivot flange 27 and the adjacent surface portion 36 on sleeve 15 define a feed and concentricity throat 33 which supplies the flowing plastic material comprising the outer layer to the space between mandrel 12 and sleeve 25. The flowing plastic material for the outer layer is supplied to feed tube 32 which communicates with circular reservoir 34 which in turn communicates with concentricity throat 33.

A flow equalizing groove 35 is formed on sleeve 15 immediately adjacent feed and concentricity throat 33. As will be explained hereinafter in detail, flow equalizing groove 35 is operative in those areas of concentricity throat 33 which are relatively closed by a particular adjustment positioning of outer layer sleeve 25 so that in the event a foreign particle is lodged at the input to the feed throat, a uniform outer layer will nonetheless be extruded (see lower half of concentricity throat 33b as is shown in FIG. 4).

The detailed operation of the extrusion die of this invention is as follows:

Feed tubes 9 and 32 are connected to the individual plastic sources which are to supply the materials required in fabricating the inner and outer layers of the tube wall, respectively. For example, in the event that the die is to be employed in the fabrication of the tube generally disclosed in Lainson Patent 2,859,476, a source of pure polyethylene resin is connected to feed tube 9, and a source of polyethylene resin processed with a carbon black agent is connected to feed tube 32. The pure polyethylene resin flows from feed tube 9 through passage 10 into reservoir 11, completely filling the reservoir, around head 14 and advances along the outer surfaces of mandrel 12. At the narrow shank of mandrel 12, the pure resin assumes a tubular form having an inside diameter which is defined by mandrel and an outside diameter defined by inner layer forming sleeve 15.

Concurrently with the feeding of the material which is to constitute the inner layer into tube 9, the material which is to constitute the outer layer is supplied to feed tube 32. This outer layer material fills reservoir 34, then flows into concentricity throat 33, and ultimately into the space between mandrel 12 and outer layer forming sleeve 25 which is not otherwise occupied by the advancing inner layer of plastic supplied at feed tube 9. The outer layer material delivered thus ultimately unites with the inner layer advancing along mandrel 12 in such a manner as to provide two well defined concentric layers which are bonded to one another.

In the event that the total tube wall, including both inner and outer layers, is not concentric with the bore of the tube (longitudinal axis 30), screws 18 are manually adjusted so that the inner layer forming sleeve 15 which also carries outer layer forming sleeve 25 is appropriately moved relative to mandrel 12. The concentricity of the total tube wall with respect to its bore is thereby altered.

In the event that the relative concentricity of the inner and outer layers is not satisfactory, screws 26 are manually adjusted in the appropriate direction whereby outer layer forming sleeve 25 is pivoted on its longitudinal axis about center 29 on the bearing surfaces 28. This operation adjusts the annular orifice of the concentricity throat 33, and in turn the relative quantity of outer layer material supplied to the various points on the periphery of the advancing inner layer.

The function of flow equalizing groove 35 with reference to the particular dimensions of an experimental die is as follows:

The radius R (FIG. 4) used in the die is two inches. A downward movement of the adjusting screw 26a (FIG. 4) closes the throat orifice at 33b more than it does at 33a. This differential is significant because when the concentricity throat is formed by parallel surfaces 31–36 (FIG. 3), the throat width provided in the dies is .030 inch.

The outer layer material is screened before it enters the delivery tube 32 by passing it through a .030 inch screen, but when throat area 33b is closed somewhat by adjusting the screw 26a downwardly, the throat area 33b is less than .030, for example, .020, in which case the corresponding throat area 33a would open to .040.

The .040 inch throat area 33a has no difficulty passing any material which the .030 screen lets through, but the .020 throat area 33b catches foreign particles of material smaller than .030, but larger than .020.

Such a foreign particle would then be caught in the input passages leading to throat area 33b, but the flow of material would then go around the foreign particle and would have a chance to again converge with the hydraulic flow being equalized by flow equalizing groove portion 35b before passing through the concentricity throat orifice 33b.

Reservoir 34, in conjunction with groove 35, provides an unrestricted and uniform flow of material at the complete annular orifice of throat 33.

The present die is operationally superior because of the unrestricted flow lines of material. In prior art dies, the many control openings and right angles attendant thereto make it possible for material to get out of the current flow and thereby "hang up" and degrade. The die of this invention has no such flow problems.

While there has been shown and described a preferred embodiment of the present invention, it will be understood by those skilled in the art that various rearrangements and modifications may be made therein without departing from the spirit and scope of the invention.

What is claimed is:

1. A die for extruding a multiple layer plastic tube comprising a tube forming mandrel, an inner layer forming sleeve and an outer layer forming sleeve positioned over said mandrel in an end to end relationship and defining a plastic flow space between the mandrel and the sleeves, means to supply a first plastic source constituting the inner plastic layer between the inner layer sleeve and the mandrel, means to supply a second plastic source constituting the outer plastic layer to a controlled orifice located between the two sleeves, and means adjustably pivoting the outer layer sleeve to control the relative concentricity of the inner and outer layers.

2. The combination of claim 1, in which said controlled orifice communicates with an annular flow passage bounded by generally parallel surfaces in one position of the outer layer sleeve, and with one of the surfaces being formed with a circular groove which is operative to produce plastic flow equalization in the event partial obstruction of the passage occurs.

3. A die for extruding a multiple layer plastic tube comprising a tube forming mandrel, an inner layer forming sleeve and an outer layer forming sleeve positioned over said mandrel in an end to end relationship and defining a plastic flow space between the mandrel and the sleeves, means to supply a first plastic source constituting the inner plastic layer between the inner layer sleeve and the mandrel, means to supply a second plastic source constituting the outer plastic layer to a controlled orifice located between the two sleeves, means adjustably pivoting the outer layer sleeve relative the longitudinal axis of the mandrel to control the relative concentricity of the inner and outer layers, and means adjustably moving both sleeves transversely relative the longitudinal axis of the mandrel to control the total concentricity of both layers.

4. The combination of claim 3, in which said controlled orifice communicates with an annular flow passage bounded by generally parallel surfaces in one position of the outer layer sleeve, and with one of the surfaces being formed with a circular groove which is operative to produce plastic flow equalization in the event partial obstruction of the passage occurs.

5. A die for extruding a multiple layer plastic tube comprising a tube forming mandrel, an inner layer forming sleeve and an outer layer forming sleeve positioned over said mandrel in an end to end relationship and defining a plastic flow space between the mandrel and the sleeves, a holder for the inner layer forming sleeve, a holder for the outer layer forming sleeve, a pivot flange coupled to the outer layer forming sleeve at its sleeve end adjacent the inner layer forming sleeve with said flange having a curved-segment bearing surface mating with a corresponding bearing surface on the outer sleeve holder, means to supply a first plastic source constituting the inner plastic layer between the inner layer sleeve and the mandrel, means to supply a second plastic source constituting the outer plastic layer to a controlled orifice between the flange coupled to the outer layer sleeve and the adjacent end of the inner layer sleeve, and means adjustably pivoting the outer layer sleeve on the curved bearing surfaces to control the relative concentricity of the inner and outer layers.

6. In a die for extruding a multiple layer plastic tube having a tube forming mandrel, an inner layer forming sleeve and an outer layer forming sleeve positioned over said mandrel in an end to end relationship and defining a plastic flow space between the mandrel and the sleeves, and means holding the sleeves—an improved plastic flow and relative concentricity control comprising means rotatably pivoting the outer layer sleeve with respect to the longitudinal axis of the mandrel on bearing surfaces coupled to that sleeve generally on a sleeve end portion adjacent the inner layer sleeve, with the adjacent ends of the sleeves being spaced to define an annular plastic flow passage having generally parallel surfaces in one position of the outer layer sleeve, and means adjusting the pivot position of the outer layer sleeve on the curved bearing surfaces to simultaneously relatively open and relatively close opposite sides of the annular passage by altering the generally parallel surface relationship.

7. In a die for extruding a multiple layer plastic tube having a tube forming mandrel, an inner forming sleeve and an outer layer forming sleeve positioned over said mandrel in an end to end relationship and defining a plastic flow space between the mandrel and the sleeves, and means holding the sleeves—an improved plastic flow and relative concentricity control comprising means pivoting the outer layer sleeve with respect to the longitudinal axis of the mandrel on bearing surfaces coupled to that sleeve generally on a sleeve end portion adjacent the inner layer sleeve, with the adjacent ends of the sleeves being spaced to define an annular plastic flow passage bounded by generally parallel surfaces in one position of the outer layer sleeve, and with the particular adjacent end of the inner layer sleeve being formed with a circular ringlike groove, and means adjusting the pivot position of the outer layer sleeve on the curved bearing surfaces to simultaneously relatively open and relatively close opposite sides of the annular passage by altering the generally parallel surface relationship, with the groove operating to produce plastic flow equalization in the event partial obstruction of the relatively closed portion of the passage occurs.

References Cited

UNITED STATES PATENTS

| | | |
|---|---|---|
| 2,809,393 | 10/1957 | Hauptman. |
| 2,859,476 | 11/1958 | Lainson. |
| 3,111,714 | 11/1963 | Branscum. |
| 3,184,792 | 5/1965 | Commisso. |
| 3,334,382 | 8/1967 | Lefevre. |
| 3,382,539 | 5/1968 | Zehr. |

WILLIAM J. STEPHENSON, *Primary Examiner.*

U.S. Cl. X.R.

18—13